Jan. 15, 1957     C. JOHNSON     2,777,349
CONTROL SYSTEM
Original Filed Oct. 29, 1945
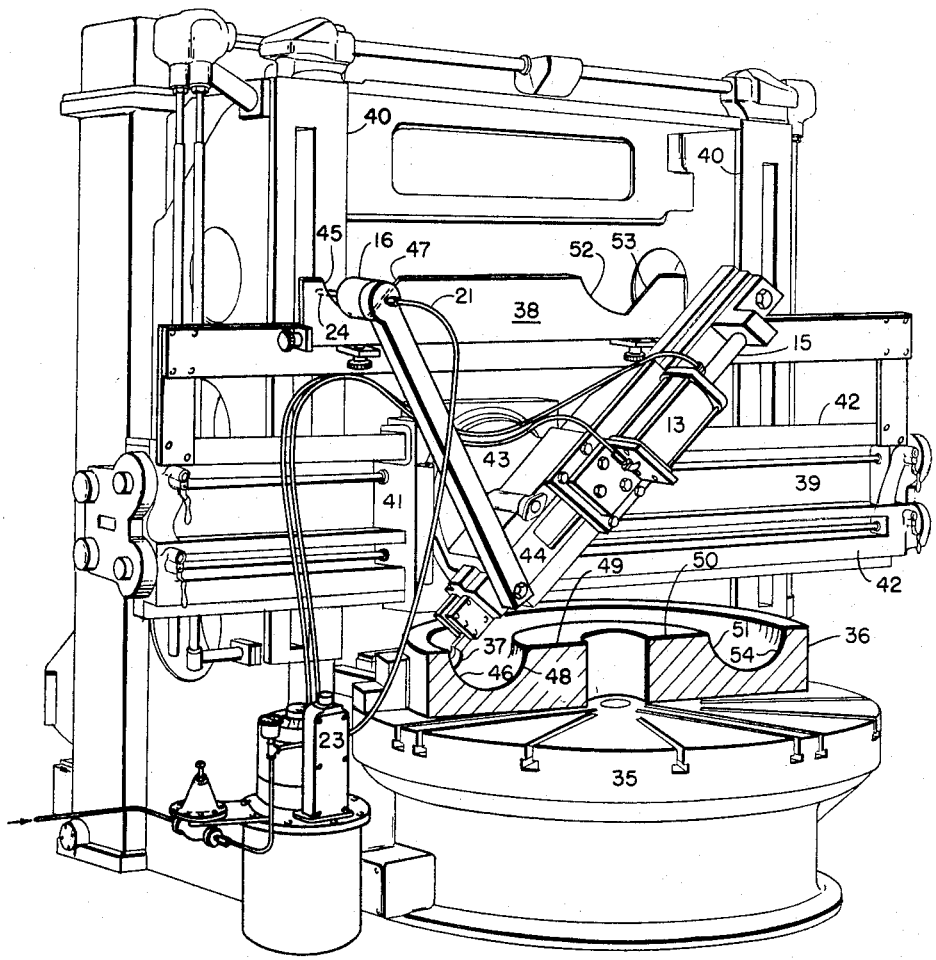
INVENTOR.
CLARENCE JOHNSON
BY
Woodling and Krost,
ATTORNEYS United States Patent Office
2,777,349
Patented Jan. 15, 1957

2,777,349

CONTROL SYSTEM

Clarence Johnson, South Euclid, Ohio, assignor to Bailey Meter Company, a corporation of Delaware Original application October 29, 1945, Serial No. 625,237. Divided and this application December 7, 1951, Serial No. 260,429

5 Claims. (Cl. 82—11)

This invention relates to a method of operating a machine tool wherein a workpiece is secured to a face plate in a machine tool and an appropriate contour is cut into the workpiece in accordance with the dictates of a pattern.

This application is a division of my application Serial Number 625,237, filed October 29, 1945, for Control System.

It is an object of this invention to operate a machine tool wherein work is cut on a face plate, according to a novel method. The method comprises rotating the workpiece in one direction while a pattern controlled tool cuts a desired contour on the workpiece and then reversing rotation of the workpiece and cutting additional contour on the other side of the axis of rotation of the workpiece.

This method may be performed on any sort of machine tool wherein the work is rotated on a face plate, and I show in the figure a specific embodiment which showing is intended to be illustrative and not as restrictive.

The figure of the drawing shows an isometric view of a vertical boring mill with pattern and tracer controlled servomotor equipment attached.

The vertical boring mill of the figure is of common type and I have therefore felt it unnecessary to show many of the details, such for example as power means for moving the saddle or head or for rotating the work table. In general, the work table 35 is rotated in the desired direction at a preselected uniform speed carrying thereupon the workpiece 36 which is to be formed by a single point cutting tool 37 to the desired shape through the dictates of a pattern 38 scanned by the tracer arm 24.

A saddle 39 is vertically positionable along columns 40. A head 41 is horizontally positionable along cross rails 42 on the saddle 39. Mounted on the head 41 and angularly positionable in a vertical plane is a swivel 43 having a tool carrying ram 44 positioned by the piston rod 15 of the servomotor 13.

I have indicated that the ram 44 is angularly positioned on the head 41 at about 45° to the horizontal and with the tool 37 engaging the left-hand wall of a generally semicircular cavity.

The table 35 and workpiece 36 are rotated past the single point cutting tool 37. The head 41 is moved at a preselected uniform rate of speed from left to right in the drawing, and during such movement the tool 37 is positioned by the ram 44, through the agency of the piston rod 15, toward or away from the work table 35 along the angle of inclination of the ram 44 and under the dictates of the tracer 24 scanning the pattern 38.

As is described in my parent application, the ram 44 carrying tool 37 is powered by means of hydraulic servomotor 13. This servomotor derives its power from a hydraulic pump and sump combination which carries thereon an air-hydraulic relay 23. This relay is actuated by the pressure in conduit 21, which pressure varies with varying relationship between the tracer head 16 and the pattern 38 as is thoroughly described in my parent application.

Referring now to the pattern 38, it will be observed that the portion 45 is shaped to produce the desired contour 46 on the workpiece down to the greatest depth of the cavity of the mold. As the head 41 moves to the right the tracer 24 follows the surface 45 to the lowermost point, and then follows an incline 47 so shaped as to give clearance of the tool 37 over the portion 48 of the workpiece. Continued travel of the head 41 to the right performs a cutting operation across the surface 49 until the tool reaches a point near the axis of rotation of the table 35 and workpiece 36. The operator then reverses the direction of rotation of the table 35 and workpiece 36 while the tool 37 passes over the already machines surface 50 and starts to cut the contour 51 (which is the contour 48) under the dictates of the tracer arm 24 scanning the surface 52. Continued motion of the head 41 to the right engages the template surface 53 by the tracer arm 24, preventing the tool 37 from engaging the already machined contour 54.

Thus it will be seen that a machining cut is taken across the entire surface of the workpiece 36 by one continued movement of the head 41 from left to right, it being necessary only to reverse direction of rotation of the table 35 and work 36 as the tool 37 passes the axis of rotation. During the initial half of its left to right travel the tool 37 machines the surfaces 46, 49, 50, 54 and during the latter half of its left to right movement it machines the surfaces 51, 48. In this manner the only change or adjustment necessary is a reversal of rotation of the table 35 and workpiece 36. It is not necessary to make any change in the angular position of the compound 43 relative to the carriage 41. Successive roughing and finishing cuts may be taken through adjustment of the template 38 exactly as described in my parent application.

It is apparent that exactly the same method of operation may be utilized in connection with face plate turning with a lathe wherein the tool is passed completely across the face of the work and change the rotation of the work as the center of rotation is passed. The movement of the head 41 along the rails 42 is continuously uniform at a preselected power feed. Similarly, in a lathe the movement of the cross-slide across the carriage (for face plate turning) may be continuously uniform at a preselected power feed but usually is by the operator turning a handwheel on the apron of the carriage.

It is apparent (referring to the figure) that the tracer assembly 16 may be rigidly supported from the saddle 39 and the template may be supported by and moved with the ram 44. This is the reverse of what is shown in the figure. Certain advantages and disadvantages accrue from such arrangement. The tracer assembly being in a fixed location, relative the various levers and handwheels of the machine as a whole, allows the operator to grasp the tracer arm 24 and move it by hand if he desires to retract or advance the tool 37 for any reason, as for example in high speed return of the tool for beginning a next cutting path. However, the template would be upside down and backwards.

It will be observed that I have provided a novel method of operating machine tools which method over comes many of the limitations heretofore ascribed to pattern and tracer controlled equipment. This method allows the machine tool operator to take full advantage of his pattern and tracer controlled machine, without the limitations and difficulties which are usually attendant to this sort of operation.

What I claim is:

1. A machine tool for face turning comprising rotatable means for mounting a workpiece for rotation on an axis at right angles to the face to be turned, reversible drive means for said rotatable means, a first slide for reciprocation along a first path at right angles to said axis and diametrically across said face from one periphery to the opposite periphery, a second slide carried on said first slide for movement to and from the face of the workpiece along a second path at an angle to said axis and said first path, said angle being such as to facilitate the cutting of slopes that face in one radial direction on one side of said axis and slopes that face in the opposite direction on the other side of said axis so that the first slope will be cut from periphery to center and the opposite slopes will be cut as the first slide moves across center to the opposite periphery, a tool mounted on said second slide, means for reversing the rotation of said reversible drive means as the tool is carried past said axis, pattern and tracer mechanisms, one of said mechanisms mounted on said second slide and the other of said mechanisms being stationary, said pattern constituting a template which provides template control for the full movement of said second slide and tool diametrically of said face from periphery across center to the opposite periphery and, at least, presents patterns for the aforesaid slopes respectively on opposite sides of said axis, means for moving said first slide at a predetermined rate, and means for moving said second slide under the control of said pattern and tracer mechanism.

2. A machine tool for face turning comprising rotatable means for mounting a workpiece for rotation on an axis at right angles to the face to be turned, reversible drive means for said rotatable means, first and second slides, tool mounting means for a tool carried on said second slide, means for mounting said first slide for reciprocation of said tool along a first path at right angles to said axis and diametrically across said face from one periphery to the opposite periphery, said second slide carried on said first slide for movement of said tool to and from the face of the workpiece along a second path at an angle to said axis and said first path, said angle being such as to facilitate the cutting of slopes that face in one radial direction on one side of said axis and slopes that face in the opposite direction on the other side of said axis so that the first slope will be cut from periphery to center and the opposite slopes will be cut as the first slide moves across center to the opposite periphery, means for reversing the rotation of said reversible drive means as the tool mounting means is carried past said axis, pattern and tracer mechanisms, one of said mechanisms mounted on said second slide and the other of said mechanisms being stationary, said pattern constituting a template which provides template control for the full movement of said second slide and tool mounting means diametrically of said face from periphery across center to the opposite periphery and, at least, presents patterns for the aforesaid slopes respectively on opposite sides of said axis, mans for moving said first slide at a predetermined rate, and means for moving said second slide under the control of said pattern and tracer mechanisms.

3. A machine tool for face turning comprising rotatable means for mounting a workpiece for rotation on an axis at right angles to the face to be turned, reversible drive means for said rotatable means, first and second members one carrying the other thereof, a toolholder mounted on the carried member to carry a tool, said first member being mounted on said machine tool for movement of said tool along a first path at right angles to said axis and across said face from one periphery to the opposite periphery, said second member being a slide member mounted on said machine tool for movement of said tool to and from the face of the workpiece along a second path at an angle to said axis and said first path, said angle being such as to facilitate the cutting of slopes that face in one radial direction on one side of said axis and slopes that face in the opposite direction on the other side of said axis so that the first slope will be cut from periphery to center and the opposite slopes will be cut as the first member moves across the axis toward the opposite periphery, means for reversing the rotation of said reversible drive means as the toolholder is carried past said axis, pattern and tracer mechanisms, one of said mechanisms mounted on said carried member and the other of said mechanisms being stationary, said pattern mechanism including a holder for a template which provides template control for movement of said toolholder across said face from periphery across the axis toward the opposite periphery and, at least, presents patterns for the aforesaid slopes respectively on opposite sides of said axis, means for moving said first member at a predetermined rate, and means for moving said slide member under the control of said pattern and tracer mechanisms.

4. A machine tool having a frame, a workholder for supporting and rotating a workpiece in either direction about an axis at right angles to the face to be turned and relative to said frame, first and second slides one mounted on said frame and carrying the other thereof, a toolholder carried by said carried slide for carrying a tool to operate on said workpiece, means for mounting said first slide for reciprocation of said tool along a first path generally perpendicular to said axis from one side of said axis to the other, means for mounting said second slide for reciprocation of said tool along a second path at an acute angle to said first path and at an acute angle, means mounting one of said pattern means and tracer control means to said axis, pattern means and tracer control means on said machine tool frame, means mounting the other of said pattern means and tracer control means for partaking of the movement of said toolholder along said first and second paths relative to said workholder, power means controlled by said pattern and tracer control means to move said second slide, motive means to move said first slide and hence to move said tool along said first path in a first cycle from the outer periphery of said workpiece to the axis thereof and continuously in a second cycle from said axis toward the opposite outer periphery of said workpiece, said tool during said first cycle being controlled along said second path by said pattern and tracer control means to form a contour on said workpiece from the outer extremity of said workpiece toward said axis, and means for reversing said workholder as the toolholder passes said axis, said tool during said second cycle being controlled along said second path by said pattern and tracer control means to form additional contour thereon in locations inaccessible to said tool during said first cycle.

5. A machine tool for face turning comprising, rotatable means for mounting a workpiece for rotation on an axis at right angles to the face to be turned, reversible drive means for said rotatable means, a first slide, a second slide carried thereon, means for mounting a tool on said second slide, one of said slides reciprocating along a first path diametrically across said face in a first cycle direction from one periphery to the center and in a second cycle direction from the center toward the opposite periphery, the other of said slides mounted for movement to and from the face of the workpiece along a second path to create a contour on said face, said movement being such as to facilitate, in the first cycle, the cutting of contours that are accessible on one side of said axis and inaccessible on the other side of said axis and, in the second cycle, the cutting of contours on the other side of said axis inaccessible during the first cycle so that the first cycle will cut contours in the movement of said one slide from periphery to center and the second cycle will cut contours as the said one slide moves from center toward the opposite periphery, means for reversing the rotation of said reversible drive means as the tool is carried past said axis, control mechanism for providing continuous contour control during the first and second cycles and for the full movement of said one slide and tool diametrically of said face in a direction from one periphery across center toward the opposite periphery and presents contour control on opposite sides of said axis, means for moving said one slide at a predetermined rate, and means for moving said other slide under the control of said control mechanism.

References Cited in the file of this patent

UNITED STATES PATENTS

| | | |
|---|---|---|
| 9,616 | Aldrich | Mar. 15, 1853 |
| 400,820 | Back | Apr. 2, 1899 |
| 864,655 | Kuehner | Aug. 27, 1907 |
| 1,286,309 | Hawley | Dec. 3, 1918 |
| 1,342,983 | Breen | June 8, 1920 |
| 1,611,191 | Heard | Dec. 21, 1926 |
| 2,437,570 | Von Zelensky | Mar. 9, 1948 |

FOREIGN PATENTS

| | | |
|---|---|---|
| 318,483 | Germany | Feb. 4, 1920 |
| 561,041 | Great Britain | May 2, 1944 |
| 660,112 | Great Britain | Oct. 31, 1951 |